(No Model.)
F. L. RÖDEL.
ADJUSTABLE CRANK FOR VELOCIPEDES.
No. 386,896. Patented July 31, 1888.
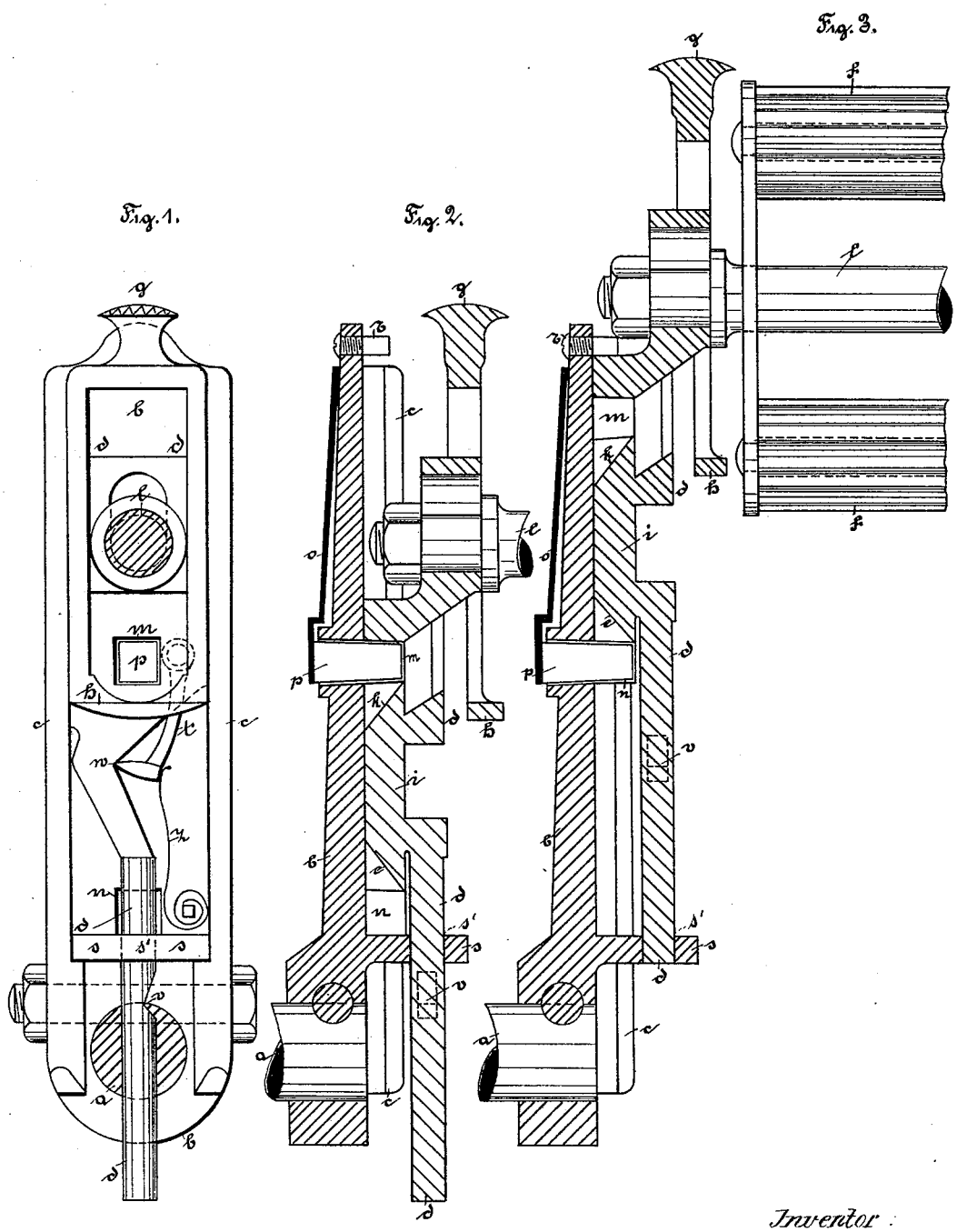

UNITED STATES PATENT OFFICE.

FRANZ LOUIS RÖDEL, OF ELSTERBERG, SAXONY, GERMANY.

ADJUSTABLE CRANK FOR VELOCIPEDES.

SPECIFICATION forming part of Letters Patent No. 386,896, dated July 31, 1888.

Application filed December 27, 1887. Serial No. 259,033. (No model.) Patented in Germany August 27, 1887, and in England November 17, 1887, No. 15,800.

*To all whom it may concern:*

Be it known that I, FRANZ LOUIS RÖDEL, a subject of the King of Saxony, residing at the town of Elsterberg, in the Kingdom of Saxony and Empire of Germany, have invented a new and useful Improvement in Adjustable Cranks for Bicycles and Tricycles, (for which I have received a patent from the Kingdom of Great Britain, No. 15,800, November 17, 1887, and for which I made application for a patent of the German Empire August 26, 1887,) of which the following is a specification.

The nature of the invention consists in the details of construction and combination, substantially as illustrated in the drawings, hereinafter described, eventually pointed out in the claim.

Figure 1 is a front view of my newly-invented adjustable crank. Fig. 2 is a sectional view illustrating the same as contracted to its shorter length of adjustment. Fig. 3 is another sectional view illustrating the same as extended to its longest length of adjustment.

The shaft of the driving-wheel is designated by $a$. Upon this is rigidly fastened the crank-arm $b$. The outside of this arm is constructed with a guide, $c$, and is formed with a projection, $s$, in which is a cylindrical hole, $s'$. The axle $l$ of the pedal is supported by the adjustable piece $d\ i\ m\ h\ g$. The cylindrical shank $d$ of this piece is adapted to move in the hole $s'$, and the body $i$ to slide in the guide $c$.

$p$ is a sliding pin movable in the socket $n$, whose motion is controlled by the resilience of the spring $o$.

$g$ and $h$ are extensions of the hub, in which is mounted the shaft $l$ of the pedals $f$.

$t$ is a pawl on which works the spring $z$. This spring and pawl are attached, as illustrated, to the rigid arm $b$, the whole device to be as illustrated in the drawings.

If the crank be in the short adjustment represented in Fig. 2 and the operator desires to lengthen it, the crank is brought into such a position that the projection $h$ will stand upward. The operator then presses on this projection with his foot. This causes the part $d\ i\ m\ h\ g$ to slip away from the axle $a$ and the inclined surface $k$ to impinge upon the surface of the pin $p$ and push the pin backward in the socket $n$ against the spring $o$, which spring bends more and more as the pin is pressed against it. At the same time the curve $w$ begins to move under the pawl $t$, pressing it against the spring $z$, which is bent more and more. This is continued until the pawl $t$ falls into the curve $v$, the inclined surface $e$ passes the pin $p$, the end $m$ impinges upon the pin $r$, and the parts have assumed the positions illustrated in Fig. 3; but if the crank be in the position illustrated in Fig. 3 and it is desired to change it to a shorter adjustment, the projection $g$ is turned upward and pressed by the foot of the operator. Then the reverse of the motion just described takes place until the parts assume the positions represented in Figs. 1 and 2.

What I claim as my invention, and desire to secure by Letters Patent, is—

The combination, with the shaft $a$ and the arm $b$, mounted upon said shaft, having the guide $c$, having the socket $n$, the projection $s$, the hole $s'$, the pin $p$, the spring $o$, the pawl $t$, the spring $z$, and the pin $r$, of the adjustable piece $d\ i\ m\ g\ h$, movable and adjustable in the hole $s'$, and the guide $c$, having curves $w$ and $v$, adapted to the pawl $t$, having inclined surfaces adapted to the pin $p$ and supporting the shaft $l$ of the pedal $f$, all substantially as and for the purpose set forth.

In witness whereof I hereunto set my hand in presence of two witnesses.

FRANZ LOUIS RÖDEL.

Witnesses:
 HERMANN GOTTFRIED RIEDEL,
 JOHAN HEINRICH OHITZ.